Sept. 24, 1940.   J. JOHNSON   2,216,080
AIRPLANE
Filed May 11, 1939
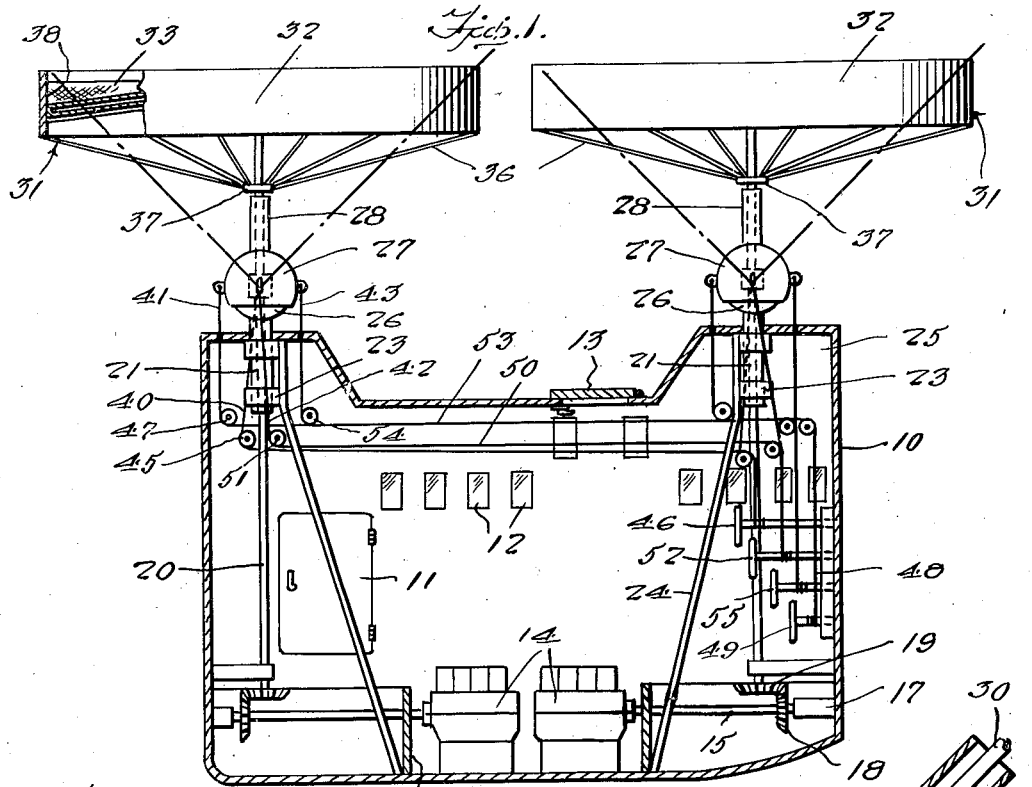
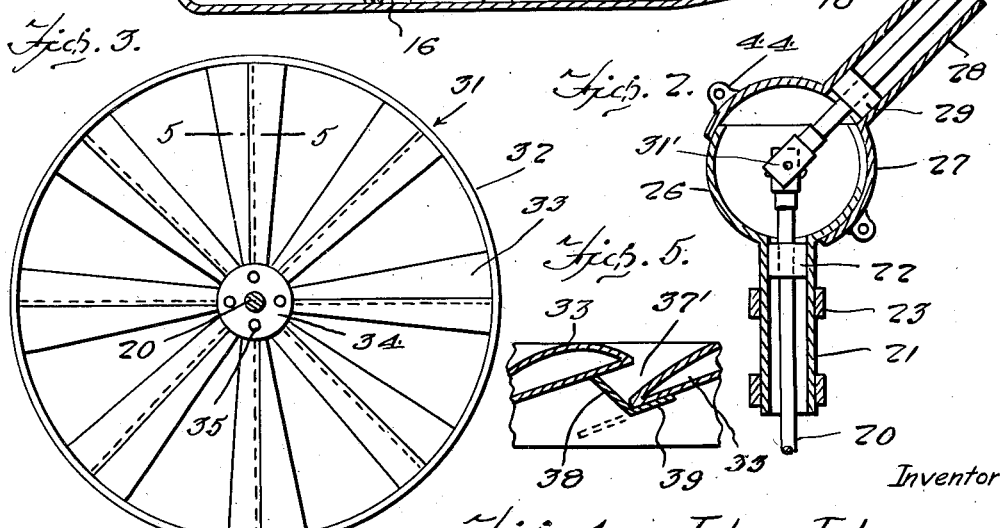
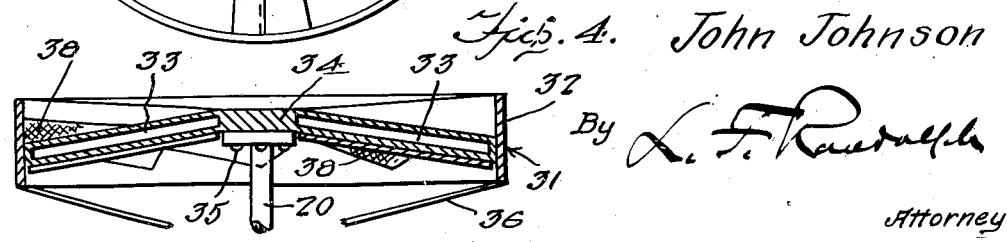
Inventor
John Johnson
By L. F. Randolph
Attorney Patented Sept. 24, 1940

2,216,080

UNITED STATES PATENT OFFICE 2,216,080

AIRPLANE

John Johnson, Los Angeles, Calif.

Application May 11, 1939, Serial No. 273,099

3 Claims. (Cl. 244—17)

This invention relates to an airplane.

It aims to provide a novel and superior construction and especially one which may travel substantially in a straight up and down course, forward, backward, sideways, remain still in the air, may land on or ascend from land, water or snow, and which may come to a standstill while in the air in the event of failure of a propeller or propellers so as to descend slowly and with safety.

Another object is to provide such a construction wherein the cabin and practically all parts may be constructed from metal.

It is further aimed to provide a novel propeller which is normally open and which is adapted to close in the event of failure to facilitate slow and safe descent.

The more specific objects and advantages will become apparent from a consideration of the description following taken in connection with accompanying drawing illustrating an operative embodiment.

In said drawing:

Figure 1 is a view primarily in central longitudinal section through an airplane showing my improvements;

Figure 2 is an enlarged section taken through one of the plane-mounting joints;

Figure 3 is a plan view of one of the propellers;

Figure 4 is a substantially central vertical section through one of the propellers, and Figure 5 is a detail section taken on the line 5—5 of Figure 3.

Referring specifically to the drawing wherein like reference characters designate like or similar parts, the airplane has a fuselage or cabin as at 10, of any suitable size and shape which is preferably made of metal. Such cabin has a door 11, windows 12 and a trapdoor 13 all of which are capable of being closed airtight.

Within the cabin, a suitable motor or motors are provided. Two are shown of conventional design as at 14, driving horizontal shafts 15 which are journaled in walls 16 serving as bearings and also in bearings 17 at their outer ends. Beveled gear wheels 18 are keyed to shafts 15 and are enmeshed with beveled gears 19, on vertical shafts 20 which extend upwardly through tubes 21, having bearings 22 therein for the shafts. Such tubes 21 are rigidly clamped or otherwise secured as at 23 to the upper portions of struts or braces 24 fastened at both ends to the fuselage or cabin wall. At their lower ends, they preferably terminate and are also secured to the walls 16. The cabin at the top, at opposite ends, is preferably enlarged as shown as at 25 to accommodate the tubes 21 and their mounting.

Said tubes 21 at their upper ends have spherical portions 26 which are outwardly engaged by spherical portions 27 to form ball and socket or substantially universal joints. Integral or rigid with the spherical portions 27 are tubes 28 having bearings 29 therein.

Bearings 29 journal shafts 30 which have universal joint connections at 31 with the upper ends of the shafts 20, centrally of the ball and socket joints 26—27.

The shafts 30 at their upper ends, carry suitable lifting devices or propellers generally designated 31. These propellers may consist of an annular band 32 and spaced lifting blades 33 connected thereto and also connected to a hub 34, to which the shaft sections 20 are directly secured, as by means of rivets 35. The band 32 is preferably reinforced by braces 36 connected to their lower edges and extending at an angle downwardly therefrom and connected to a collar 37 on the shafts 20. Said blades 33 are preferably hollow as shown in Figure 5, for superior buoyant and lifting effect. As stated, they are spaced apart. The space is specifically shown or suggested at 37'.

Said spaces 37' are adapted to be automatically closed in the event the propeller or propellers should fail, through descent of the propellers, by means of flexible flaps or valves 38 which may be made of impervious canvas or any other suitable material. These flaps as at 39 are secured along one edge of each blade and they otherwise are unconnected, so that the portion in line with the spaces 37' will be free and may move into the same with their free longitudinal edges in intimate contact with the under surfaces thereof.

The ball and socket or universal joints as at 26—27 and 31, enable the propellers to be disposed at any desired angle in use, according to whether the airship is to ascend, descend or travel forwardly, rearwardly or sideways. Any suitable or conventional means may be provided to accomplish this end through connection with the socket portions 27. As shown, four flexible draw elements 40, 41, 42 and 43 are connected to each spherical socket portion 27 as at eyelets 44 thereon. The number of these elements may be increased or diminished as preferred. The draw elements 40 are connected together and trained over guide pulleys 45 and connected to a conventional windlass device 46. Elements 41 are connected together and trained over guide pulleys 47 and operatively connected to a suitable windless device 49. The elements 42 are also connected together and to a draw element 50, trained over pulleys 51 and connected to a windlass 52. Finally, the draw elements 43 are connected to a draw element 53, trained over pulleys 54, and connected to a windlass device 55. It will be understood that the windlass devices and draw elements are merely conventionally shown.

It will be understood that the operation of the motors 14 through the gearing described, will rotate the propellers whose lifting and buoying effect will cause movement of the ship, under proper control, in all directions. A rudder may be provided, if desired. The propellers may be shifted to any desired angle through adjustment of the windlasses and in the event of failure, through descent, the flaps 38 will impinge upon the air and move to the closed positions shown in full line in Figure 5, so that descent will be slow and safe.

The blades of both propellers are at the same angle but the propellers are preferably simultaneously driven in opposite directions.

Various changes may be resorted to provided they fall within the spirit and scope of the invention.

I claim as my invention:

1. An airship of the class described having a cabin, tubes disposed vertically therein, shafts extending through the tubes and journaled therein, means in the cabin to operate the shafts, propellers on said shafts operable in opposite directions, tubes on the propellers, ball and socket joints between the first and second mentioned tubes, and universal joint connections within the ball and socket joint connections between the propellers and shafts.

2. An airship of the class described having a cabin, tubes disposed vertically therein, shafts extending through the tubes and journaled therein, means in the cabin to operate the shafts, propellers on said shafts operable in opposite directions, tubes on the propellers, ball and socket joints between the first and second mentioned tubes, universal joint connections within the ball and socket joint connections between the propellers and shafts, and operating means connected to the ball and socket joints extending interiorly of the cabin.

3. An airship of the class described having a cabin, tubes disposed vertically therein, shafts extending through the tubes and journaled therein, means in the cabin to operate the shafts, propellers on said shafts operable in opposite directions, tubes on the propellers, ball and socket joints between the first and second mentioned tubes, universal joint connections within the ball and socket joint connections between the propellers and shafts, operating means connected to the ball and socket joints extending interiorly of the cabin, struts within the cabin to which the first mentioned tubes are connected, and bearings for the first mentioned means abutted at the lower ends by the struts.

JOHN JOHNSON.